No. 815,635. PATENTED MAR. 20, 1906.
J. P. POOL.
NAVIGABLE VESSEL.
APPLICATION FILED SEPT. 23, 1904.

2 SHEETS—SHEET 1.

Witnesses
Wm H Hawkins.
Edgar B. Haymond.

James P. Pool, Inventor
By his Attorney

No. 815,635. PATENTED MAR. 20, 1906.
J. P. POOL.
NAVIGABLE VESSEL.
APPLICATION FILED SEPT. 23, 1904.

2 SHEETS—SHEET 2.

UNITED STATES PATENT OFFICE.

JAMES P. POOL, OF NEW YORK, N. Y.

NAVIGABLE VESSEL.

No. 815,635.  Specification of Letters Patent.  Patented March 20, 1906.

Application filed September 23, 1904. Serial No. 225,571.

*To all whom it may concern:*

Be it known that I, JAMES P. POOL, a citizen of the United States, residing in the borough of Brooklyn, in the county of Kings and city and State of New York, have invented certain new and useful Improvements in Navigable Vessels, of which the following is a specification.

This invention relates to navigable vessels; and it has for its object to provide improvements in vessels of this class whereby shall be obtained greater stability in the movements of the vessel through the water or other supporting medium, and consequently greater speed of movement and comfort and security of persons carried by the vessel.

In another application for patent, Serial No. 225,572, filed simultaneously with the present application, I have disclosed and claim another species of the invention disclosed and claimed in this present application.

Figure 2:
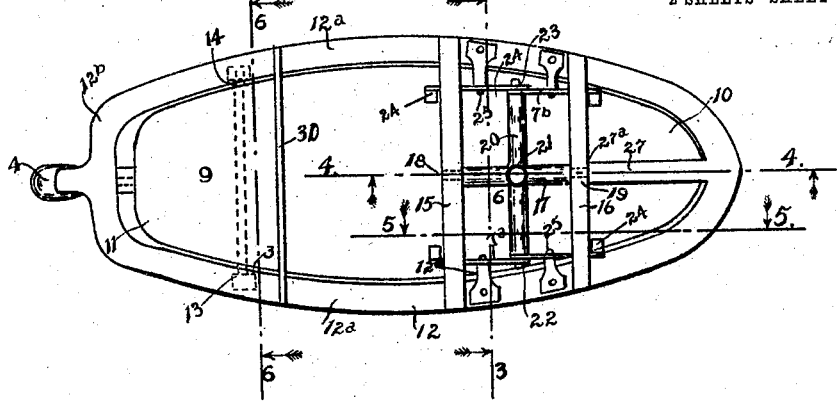
Figure 3:
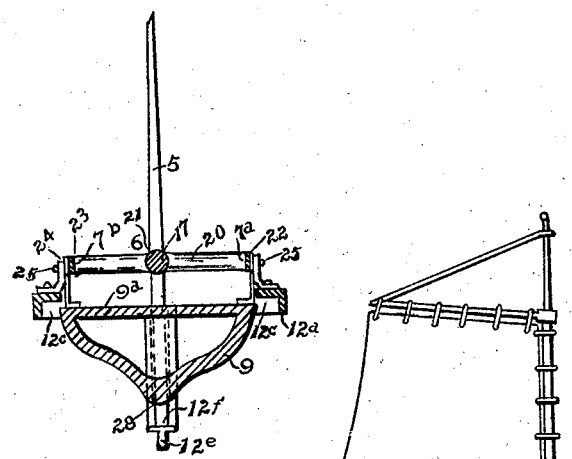
Figure 1:
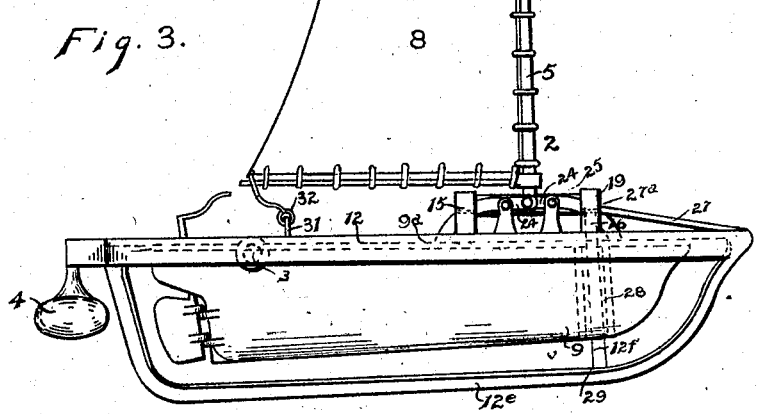
Figure 5:
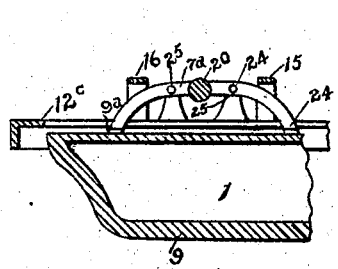
Figure 6:
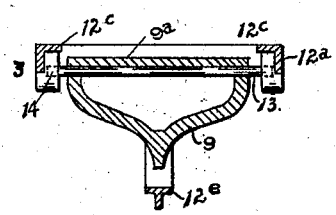
Figure 4:
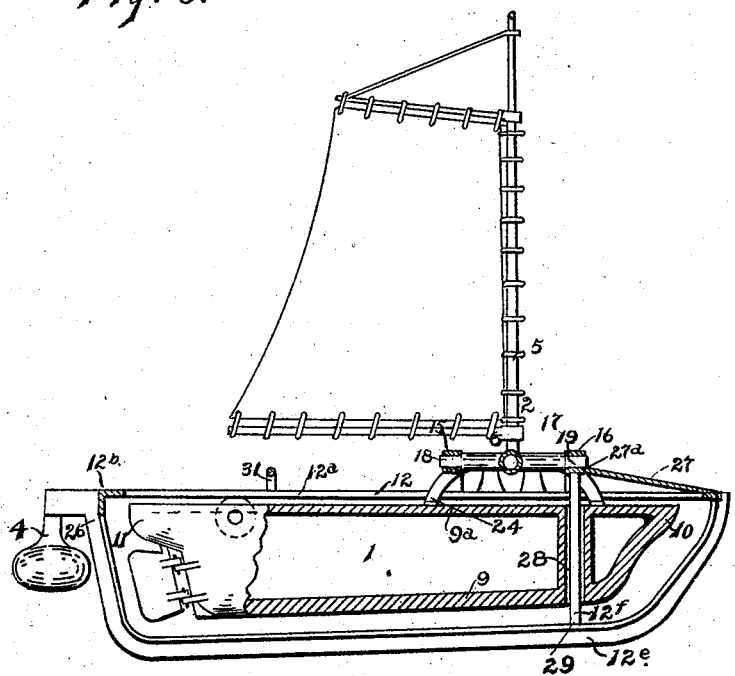

In the drawings, Figure 1 is a side elevation of a sailing vessel constructed according to the invention. Fig. 2 is a plan view of the same. Fig. 3 is a vertical transverse sectional view taken upon the line 3 3, Fig. 2, and looking in the direction of the appended arrows. Fig. 4 is a vertical longitudinal sectional view taken upon the line 4 4, Fig. 2, and looking in the direction of the appended arrows. Fig. 5 is a vertical longitudinal sectional view taken upon the line 5 5, Fig. 2, and looking in the direction of the appended arrows; and Fig. 6 is a vertical transverse sectional view taken upon the line 6 6, Fig. 2, and looking in the direction of the appended arrows.

Corresponding reference characters refer to the same parts in all the figures.

Referring with particularity to the drawings, the improved vessel comprises a load-carrying member 1 and a sail-carrying member 2, which are connected together, as at 3, in such manner as to be capable of relative and preferably pivotal movement. The load-carrying member 1 is adapted to rest directly upon the water or other supporting medium. The sail-carrying member is provided with a counterweight 4, which is preferably arranged rearwardly of the load-carrying member 1 and serves to prevent sudden relative movement of the load-carrying member and the sail-carrying member. The sail-carrying member and the counterweight 4 are rigidly connected together, so that pivotal movement of the sail-carrying member is accompanied by pivotal movement of the counterweight 4, and the counterweight 4 is arranged to depend within the water or other supporting medium.

The sail-carrying member 2 is provided with a mast 5, said mast projecting above the load-carrying member, the sail-carrying member 2 extending across and above the load-carrying member to support the mast 5 in such position. The sail-carrying member 2 is operatively connected with the load-carrying member 1 by means of independent operative connections 6 and $7^a$ and $7^b$, respectively, the operative connection 6 thus being arranged to operate with respect to the load-carrying member at both sides of the same and the operative connections $7^a$ and $7^b$ being arranged to bear with relation to the load-carrying member 1, respectively, at opposite sides of the load-carrying member 1 and preferably through the agency of the operative connection 6. The mast 5 is directly connected with the operative connection 6, which is movably supported by the sail-carrying member 2 in such manner that under air-pressure upon the sail 8 the mast 5 is caused to careen or oscillate laterally of the vessel, resulting in the depression of the load-carrying member 1 at one side of the same by the operative connection 6 and the depression of the load-carrying member 1 at the other side of the same by the operative connection $7^a$ or $7^b$ through the agency of the operative connection 6. Such depression of the load-carrying member 1 consists actually in relative vertical movement of the load-carrying member 1 and the sail-carrying member 2, the sail-carrying member 2 being in practice under careening or oscillation of the mast 5 elevated or the load-carrying member 1 being depressed.

A preferable form of construction, arrangement, and operative connection of the parts and members of a vessel constructed according to the invention is as follows: The load-carrying member 1 consists of a hull 9 of conventional or other preferred form provided with the customary tapering bow portion 10 and with the stern portion 11. The sail-carrying member 2 consists, essentially, of an elongated frame 12, which extends around the stern 11 of the hull 9 and is provided with side portions $12^a$, extending longitudinally of the hull 9 and at the sides of the same and connected by a transverse stern portion $12^b$, extending rearwardly of the stern portion 11 of the hull 9. The transverse portion 12^b of the frame 12 carries the counterweight 4. The frame 12 is connected pivotally with the hull 9 at opposite sides of the same and adjacent to the stern portion 11 of the same, as at 13 and 14, respectively, so that the side members 12^a of said frame 12 are free to oscillate vertically. Adjacent to the bow portion 10 of the hull 9 the side members 12^a of the frame 12 extend inboard of and above the hull 9 to a predetermined extent, as at 12^c, at opposite sides of the hull 9, and the extended portions 12^c of the frame 12 are connected by transverse frame portions 15 and 16, respectively. Between the transverse frame portions 15 and 16 is a pivotally-supported and longitudinal frame portion 17, said portion 17 being pivotally connected with the frame portions 15 and 16, as at 18 and 19, respectively. The operative connection 6, which supports the mast 5 and extends transversely of and above the hull 9 of the load-carrying member 1, consists of a beam or bar 20, which is centrally and rigidly connected with the longitudinal frame portion 17, as at 21. The beam or bar 20 is thus free to oscillate in a vertical plane upon the longitudinal frame portion 17, and the opposite end portions 22 and 23, respectively, of the beam or bar 20 are arranged to bear upon the deck 9^a of the hull 9 at opposite sides of the same through openings 12^d in the frame portions 12^c, which extend inboard and above the hull 9 and the deck 9^a of the same. As the mast 5, which is fixed to the beam or bar 20, careens or oscillates laterally one end of said beam or bar is depressed into a position to bear upon the deck 9^a at one side of the same, and the other end of said beam or bar is elevated away from the deck 9^a.

Each of the operative connections 7^a and 7^b consists of two pivotal and approximately centrally mounted lever-arms 24, each of which is pivotally carried, as at 25, by the side frame portions 12^a and within the respective cut-away portion 12^d of the frame portion 12^c. There are thus two levers 24 at each side of the sail-carrying member 2, and said levers are arranged to play in a vertical plane and are provided in each pair with two opposed end portions beneath which the adjustable end 22 or 23 of the beam or bar 20 passes, the other end portion of such levers 24 being arranged to bear upon the deck 9^a. It thus results that when the end 22 of the beam or bar 20 is depressed by the careening or oscillation of the mast 5 said end portion 22 is caused to bear upon the deck 9^a and depress the same, together with the hull 9, and simultaneously an end portion 23 of the beam or bar 20 is elevated and the end portion of each of the levers 24 at the side of the deck 9^a at which the end portion 23 of the beam or bar 20 is arranged is pivotally depressed to bear upon and depress the deck 9^a at the respective sides of the hull 9. Therefore when the mast 5 is caused to careen or oscillate in either lateral direction the hull 9 is depressed through the medium of the deck 9^a at both sides, at one side being depressed directly by the pressure of the beam or bar 20 and at the other side being depressed through the agency of two of the levers 24.

To obtain rigidity of the sail-carrying member 2, the frame 12 of the same is provided with a lower longitudinal portion 12^e, which extends beneath the hull 9 approximately centrally, being connected at one end, as at 26, with the counterweight 4, the other end of said frame portion 12^e being extended upwardly and forward of the bow portion 10 of the hull 9 and over said bow portion 10 into connection with the transverse frame portion 16 above the deck 9^a, as at 27. The hull 9 and deck 9^a are also provided with a trunk or casing 28 extending vertically through the same and through which projects a vertical frame member 12^f, which connects with the transverse member 16, as at 27, and also connects with the lower frame member 12^e, as at 29. The vertical frame member 12^f is thus arranged to play vertically through the trunk or casing 28 in the relative vertical movements of the load-carrying member 1 and the sail-carrying member 2. The sail-carrying member 2 is also provided with a traveler device 30, which is connected at its opposite ends with the frame 12 at the forward portion 12^a of the same, as at 31, forward of the points 13 and 14 of pivotal connection of the frame 12 and the hull 9, and with such traveler device 30 the sail 8 is connected, as at 32, in the customary or any preferred manner.

The operation and advantages of the construction, arrangement, and operative connection of parts and members of the improved vessel will be readily understood from the foregoing description, taken in connection with the drawings and the following statement.

The mast 5 being rigidly connected with the operative connection 6 between the sail-carrying member 2 and the load-carrying member 1, which operative connection itself is pivotally carried by the sail-carrying member 2 above and transversely of the hull 9, as the air-currents in the propulsion of the vessel press upon the sail 8, the mast is caused to careen or oscillate laterally in either direction, and in such oscillation the operative connection 6 is caused to bear upon the load-carrying member 1 at one side of the same, and simultaneously the operative connection 6 causes the operative connection 7^a or 7^b to bear upon the load-carrying member 1 at the opposite side of the same. At both sides the load-carrying member 1 is therefore depressed or relative vertical movement is caused between the load-carrying member 1 and the sail-carrying member 2, such relative movements consisting of pivotal movement due to the pivotal connection of the load-carrying member 1 and the sail-carrying member 2 at the points 13 and 14. As the levers 24 constituting the operative connection 7ª are caused to bear upon the load-carrying member 1 at one side of the same the levers 24 constituting the operative connection 7ᵇ are released from pressure or not submitted to pressure to force them into depressive engagement with the load-carrying member 1, and similarly as the end portion 22 of the beam or bar 20 constituting the operative connection 6 is caused to bear upon one side of the load-carrying member 1, the end portion 23 of said beam or bar 20 is raised from the load-carrying member 1; but the end portion 22 or 23 of the beam or bar 20 which is elevated by the careening of the mast 5 causes the depression of the respective levers 24 at the respective sides of the vessel, depressing the respective sides of the load-carrying member 1. Thus in the lateral oscillation of the mast 5 in either direction one end portion 22 or 23 of the beam or bar 20 is caused to bear upon the load-carrying member 1, and one pair of levers 24 is also caused to bear upon the load-carrying member 1. The forward portion of the hull 9 of the load-carrying member 1 is therefore depressed in the water or other supporting medium or separated substantially vertically from the forward side portions 12ª of the frame 12 of the sail-carrying member 2 in accompaniment with any substantial careening or lateral oscillation of the mast 5, and equally at both sides of the hull 9 of the load-carrying member 1. The strain of the sail 8 upon the traveler 30, being to an extent vertical in its direction, also tends to substantially vertically separate the sail-carrying member 2 and the load-carrying member 1, increasing the corresponding effect of the operative connections 6 and 7ª and 7ᵇ.

The advantageous effect of transmuting the careenings or lateral oscillations of the mast 5 into substantially vertical relative movement of the sail-carrying member 2 and the load-carrying member 1 consists in the stability of the entire vessel resulting from the depression of the hull 9 of the load-carrying member 1 farther into the water or other supporting medium, the tendency of the entire vessel to careen being thus opposed. In sailing vessels of the conventional ordinary type when the same are proceeding in any other course than that directly before the wind the pressure of the air upon the sail or sails causes a tendency to lateral careening of the vessel, the stability of the vessel being thus upset and the comfort of persons aboard the same being interfered with, capsizing resulting from such careening of the entire vessel under extreme conditions. It will be manifest that the degree of submergence of the hull 9 at the forward portion or bow portion 10 of the same by the transmuting of the careening tendency of the mast 5 into such submergence of the forward portion of said hull is proportionate to the degree of pressure of the propelling-air upon the sail 8 and that the vessel instead of being careened over and substantially rolled out of the water is kept upon a substantially even keel within the water in a position of satisfactory equilibrium. The counterweight 4 by its projection within the water or other supporting medium also tends to balance the entire vessel and oppose any tendency to lateral careening of the entirety, opposing also any extreme or sudden relative movement of the sail-carrying member 2 and the load-carrying member 1.

The frame 12 of the sail-carrying member 2 is increased in its rigidity and firmness of connection of portions by the lower longitudinal portion 12ᵉ of said frame, and said frame 12 is effectually braced above the deck 9ª of the hull 9 by the transverse frame portions 15 and 16.

I do not desire to be understood as limiting myself to the specific construction, relative arrangement, and operative connection of parts and members as described and shown, but reserve the right to vary the same in adapting the improvements to varying conditions or use without departing from the spirit of the invention or the terms of the following claims.

Having thus described my invention, I claim and desire to secure by Letters Patent—

1. A vessel of the character described, comprising a sail-carrying member and a load-carrying member connected together and capable of relative movement and operative connections extending between said sail-carrying member and said load-carrying member to cause movement of one of said members by the other of said members relative to the latter member under pressure upon the sail-carrying member.

2. A vessel of the character described, comprising a sail-carrying member and a load-carrying member connected together and capable of relative movement, said load-carrying member being adapted to rest upon the supporting medium, and operative connections extending between said sail-carrying member and said load-carrying member and arranged to transmit pressure from the sail-carrying member to the load-carrying member to relatively move said members, the said sail-carrying member comprising a movably-mounted mast and sail.

3. A vessel of the character described, comprising a load-carrying member adapted to rest upon the supporting medium, a sail-carrying member pivotally connected with the load-carrying member and provided with a movably-mounted mast and sail; and operative connections extending between said mast and sail and said load-carrying member to cause pivotal movement of said load-carrying member relative to said sail-carrying member.

4. A vessel of the character described, comprising a load-carrying member, a sail-carrying member operatively connected with said load-carrying member and capable of movement with relation to said load-carrying member, said sail-carrying member comprising a movably-mounted sail and mast, and operative connections extending between the said sail and mast and said load-carrying member to cause movement of said load-carrying member by said sail-carrying member relative to said sail-carrying member.

5. A vessel of the character described, comprising a sail-carrying member, a load-carrying member connected with said sail-carrying member and capable of movement with relation thereto, said sail-carrying member comprising a movably-mounted mast and sail; and operative connections extending between said sail-carrying member and said load-carrying member whereby movement of said mast and sail causes movement of said load-carrying member relative to said sail-carrying member.

6. A vessel of the character described, comprising a load-carrying member consisting of a hull, a sail-carrying member consisting of a frame pivotally connected with said hull and provided with a portion extending transversely above said hull, a mast pivotally carried by the said frame above said hull, and operative connections extending between said mast and said hull.

7. A vessel of the character described, comprising a load-carrying member, consisting of a hull; and a sail-carrying member comprising a frame pivotally connected with said hull and provided with a portion extending transversely of and above said hull, a mast pivotally carried by said frame above said hull, and a transverse bar connected with said mast and arranged to bear alternately at its opposite ends at opposite sides of said hull.

8. A vessel of the character described, comprising a load-carrying member, consisting of a hull; and a sail-carrying member comprising a frame pivotally connected with said hull and provided with a transverse portion extending above said hull, a bar extending transversely above said hull and carried pivotally by said frame, a mast fixed to said bar, and a separate lever pivotally connected with said frame at each side of said hull, said bar projecting at its opposite ends into connection respectively with said levers, whereby in the oscillation of said mast the ends of said bar and said levers are caused to bear upon said hull alternately at opposite sides of the same.

9. A vessel of the character described comprising a load-carrying member, consisting of a hull; and a sail-carrying member, comprising a frame pivotally connected with said hull at the rearward portion of the same and provided with side members extending longitudinally of said hull and with transverse portions extending above the forward portion of said hull, a transverse bar pivotally supported by and between said transverse portions of said frame and arranged to bear at its opposite end portions alternately upon said hull, two levers arranged at each side of said hull and in engagement with one end portion of said transverse bar, and a mast affixed to said transverse bar, whereby the oscillation of said mast causes two of said levers to be depressed upon said hull through the agency of one end portion of said transverse bar and causes the other end of said transverse bar to bear upon said hull.

10. In a vessel of the character described, a load-carrying member, consisting of a hull; and a sail-carrying member operatively connected with said hull at the rearward portion of the same and comprising longitudinal side portions, a transverse member extending above said hull, and a lower longitudinal member connected with the rearward portion of said side portions and extending beneath and forward of said hull into connection with said transverse member.

11. In a vessel of the character described, a load-carrying member, consisting of a hull; and a sail-carrying member comprising a frame pivotally connected with said hull at the rearward portion of the same and comprising longitudinal side portions, a transverse portion extending above said hull, and a lower portion extending longitudinally beneath and forward of said hull and connected with the rearward portion of said side portions and with said transverse portion, said lower portion being also connected with said transverse portion by a vertical portion extending upwardly through said hull.

In witness whereof I have signed my name to this specification in the presence of two subscribing witnesses.

JAMES P. POOL.

Witnesses:
RAYMOND I. BLAKESLEY,
JOHN G. HONEY.